(12) United States Patent
Wartmann

(10) Patent No.: US 7,382,542 B2
(45) Date of Patent: Jun. 3, 2008

(54) HIGH-APERTURE OPTICAL IMAGING SYSTEM, PARTICULARLY FOR MICROSCOPES

(75) Inventor: Rolf Wartmann, Waake (DE)

(73) Assignee: Carl Zeiss MicroImaging GmbH, Jena (DE)

(*) Notice: Subject to any disclaimer, the term of this patent is extended or adjusted under 35 U.S.C. 154(b) by 88 days.

(21) Appl. No.: 11/551,546

(22) Filed: Oct. 20, 2006

(65) Prior Publication Data

US 2007/0091454 A1    Apr. 26, 2007

(30) Foreign Application Priority Data

Oct. 21, 2005   (DE)   ............ 10 2005 051 025

(51) Int. Cl.
*G02B 21/02*   (2006.01)

(52) U.S. Cl. ................................. 359/656; 359/658
(58) Field of Classification Search ......... 359/656–661
See application file for complete search history.

(56) References Cited

U.S. PATENT DOCUMENTS

| 5,502,596 | A | 3/1996 | Suzuki |
| 5,659,425 | A | 8/1997 | Suzuki |
| 5,982,559 | A | 11/1999 | Furutake |
| 7,019,910 | B2 * | 3/2006 | Hoppen ............ 359/656 |

* cited by examiner

*Primary Examiner*—William C Choi
(74) *Attorney, Agent, or Firm*—Reed Smith LLP

(57) ABSTRACT

The invention is directed to a high-aperture optical imaging system, particularly for microscopes, which comprises an objective and a tube lens unit and in which the objective has a magnification of less than or equal to 40× and a numerical aperture of greater than or equal to 1.0 and is chromatically corrected up to the infrared.

13 Claims, 4 Drawing Sheets

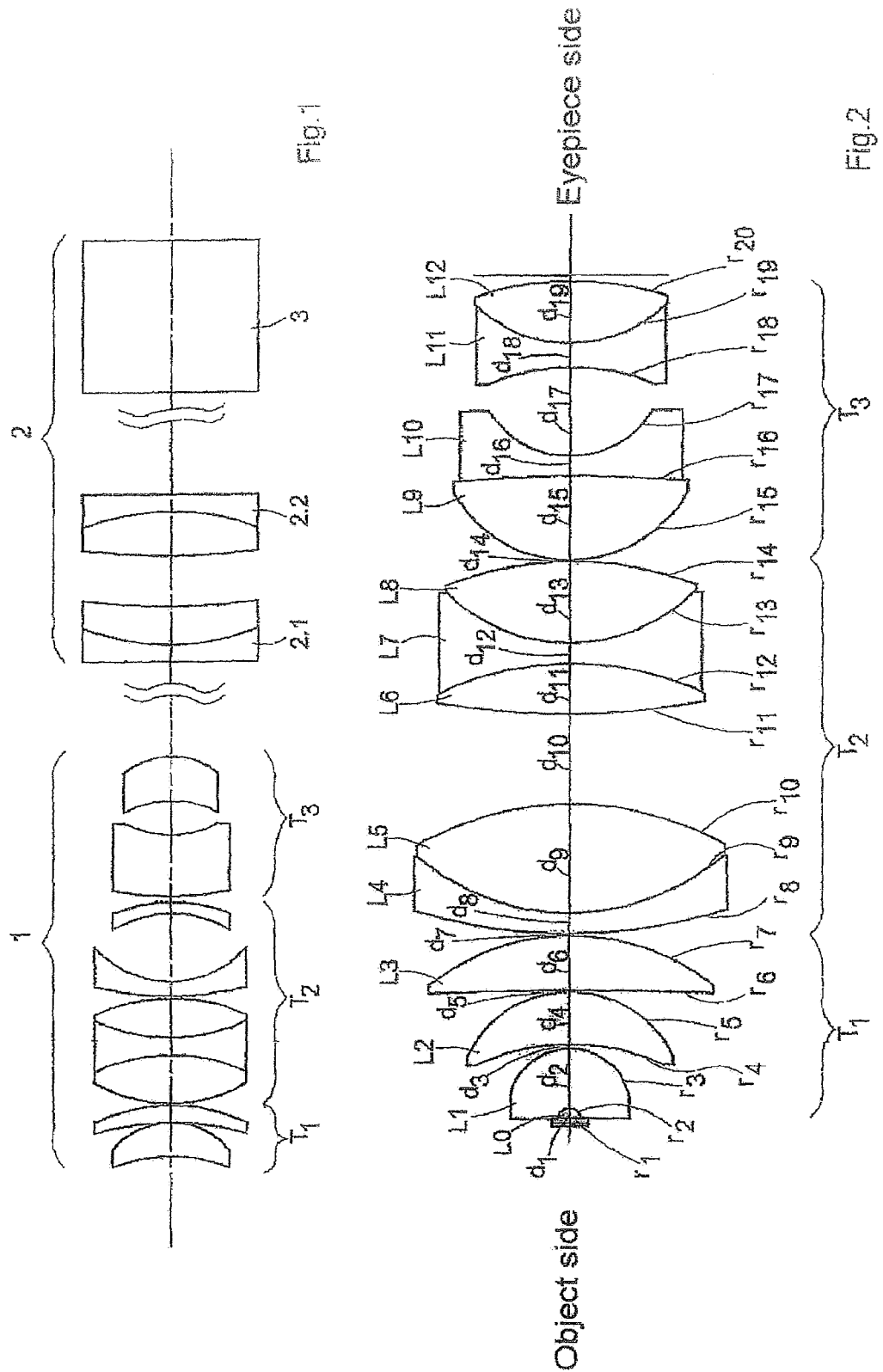

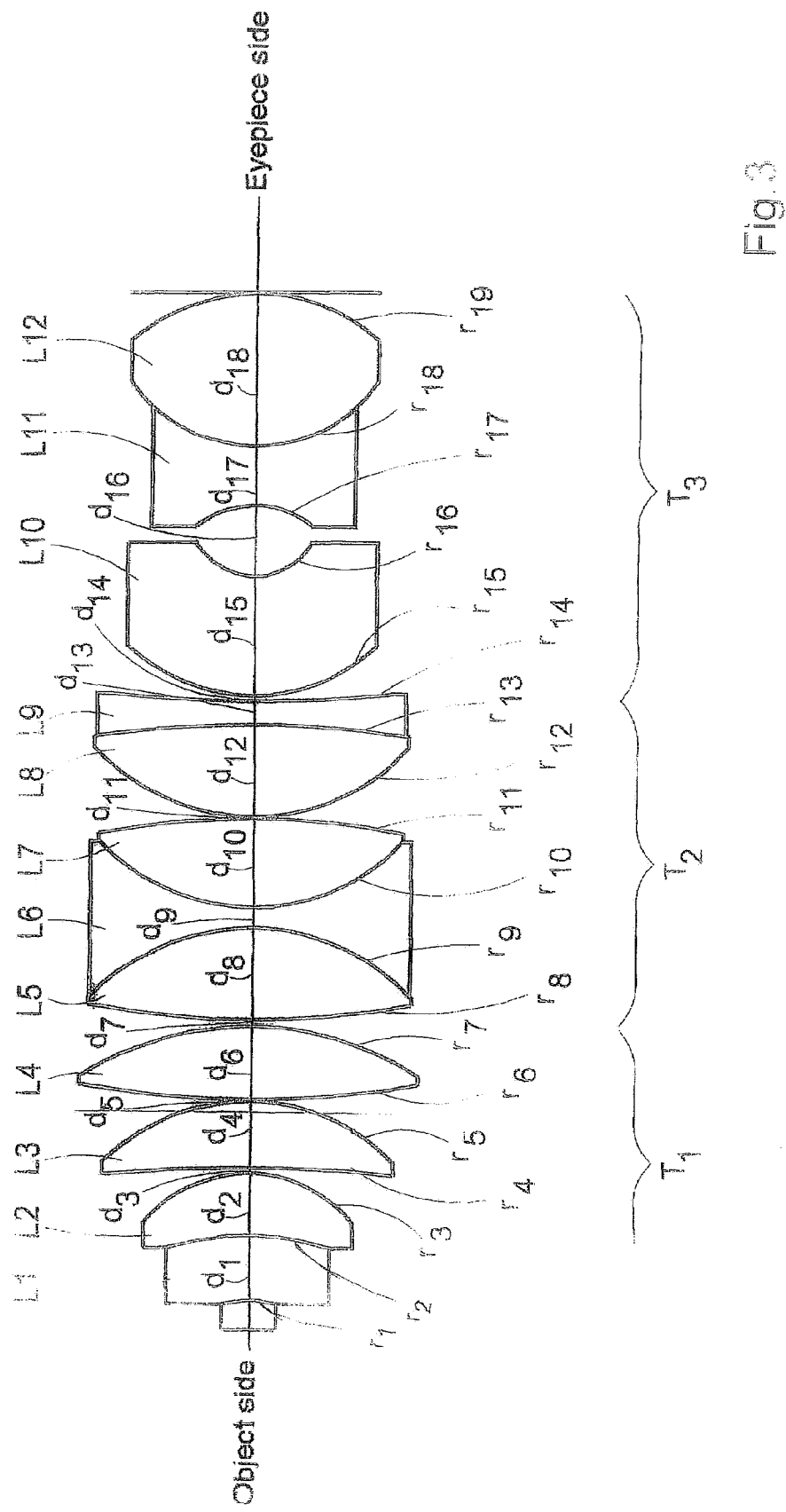

HIGH-APERTURE OPTICAL IMAGING SYSTEM, PARTICULARLY FOR MICROSCOPES

CROSS-REFERENCE TO RELATED APPLICATION

This application claims priority of German Application No. 10 2005 051 025.6, filed Oct. 21, 2005, the complete disclosure of which is hereby incorporated by reference.

BACKGROUND OF THE INVENTION a) Field of the Invention

The invention is directed to a high-aperture optical imaging system, particularly for microscopes, and relates primarily to a high-aperture immersion objective with apochromatic correction within a broad wavelength range. The imaging system has a large image field.

b) Description of the Related Art

Objectives with a lower magnification have a larger visual field and a numerical aperture that is generally lower. One of the main reasons for this is the dominance of visual observation in the microscope. However, since the resolving capacity of the human eye is limited, it does not make sense to furnish lower- and medium-magnification objectives with a high aperture. The gain in resolution achieved through a high aperture cannot be perceived by the human eye. Further, it is simpler in technical respects for a high-magnification objective to be outfitted with a high aperture than for a low-magnification objective because objectives of high magnification image only relatively small object fields.

Accordingly, objectives with a high numerical aperture traditionally also have high magnifications. An immersion objective with a magnification of 100× and a numerical aperture up to 1.65 is described in U.S. Pat. No. 5,659,425. Immersion objectives with a high numerical aperture and low magnification are not realized.

In recent times, visual observation has diminished in importance in many fields and applications and other channels of image recording have become increasingly important. These channels often possess the possibility of post-magnification which allows full exploitation of the resolving capacity of the objective. Therefore, in applications of this kind it is reasonable to work with objectives having both a lower magnification and a high aperture because a low magnification is equivalent to a large object field and, consequently, the frequently cumbersome changing of objectives can be dispensed with.

U.S. Pat. No. 5,982,559 describes an immersion objective for microscopes which comprises eight lens groups, has a numerical aperture of 1.3, a magnification of 40× and a flat image field and in which optical errors are extensively corrected. However, this objective has no apochromatic correction, particularly up to the infrared spectral region. Yet this characteristic is increasingly desirable in connection with two-photon applications.

OBJECT AND SUMMARY OF THE INVENTION

Accordingly, it is the primary object of the invention to provide a high-aperture optical imaging system for microscopes, particularly with an immersion objective, also for low magnifications, which has a large image field and apochromatic correction.

According to the invention, this object is met in an optical imaging system, in accordance with the invention, particularly for microscopes, which comprises an objective and a tube lens unit. The objective has a magnification of less than or equal to 40× and a numerical aperture of greater than or equal to 1.0 and is chromatically connected up to the infrared.

In a particularly advantageous solution, the objective of the optical imaging system comprises:

- a first partial system (T1) which has, in order from the object side, a first individual lens or has a first cemented doublet and a second individual lens and third individual lens, wherein the second individual lens and third individual lens have a total refractive power of 0.14 D to 024 D,
- a second partial system (T2) which is formed of a cemented triplet with a maximum refractive power of 0.06 D and a second cemented doublet with a refractive power of 0.12 D to 0.2 D,
- and a third partial system which comprises a cemented doublet and an individual lens or an individual lens and a meniscus formed as a cemented component or two menisci formed as cemented components, wherein, considered from the object side, the first meniscus conforms to the relationship $0.0045 < -D^*D_k < 0.0059$, and the second meniscus has essentially no refractive power, where D is the total refractive power of the objective and $D_k$ is the refractive power of the first meniscus of the third partial system (T3).

It is advantageous when the first cemented doublet has the shape of a meniscus which is concave toward the object and has a magnification factor of 1.73 to 1.81.

Further, an individual lens is provided in the first partial system instead of the first cemented doublet and the following two individual lenses are made of crown glass or $CaF_2$.

It is also advantageous when the cemented triplet of the second partial system comprises a central lens with negative refractive power made of short flint glass and two lenses with positive refractive power made of fluor crown glass or $CaF_2$.

The second cemented doublet of the second partial system advantageously comprises a lens with negative refractive power made of short flint glass and a lens with positive refractive power made of fluor crown glass or $CaF_2$.

It is likewise advantageous that the first meniscus of the third partial system is formed as a cemented component or individual lens.

Further, it is advantageous that the concave surface of the two menisci of the third partial system are adjacent, i.e., face one another.

The objective is followed by a tube lens unit as is disclosed in claim 8. This tube lens unit can advantageously comprise a lens with positive refractive power and an optical element without refractive power. Further, the tube lens unit can also comprise two cemented doublets and an optical element without refractive power which is advantageously made of BK7 glass.

The invention will be described more fully in the following with reference to an embodiment example.

BRIEF DESCRIPTION OF THE DRAWINGS

In the drawings:

FIG. 1 shows the construction of an optical system according to the invention with objective and tube lens unit;

FIG. 2 shows a lens arrangement of an objective with high aperture;

FIG. 3 shows a lens arrangement of another objective;

DESCRIPTION OF THE PREFERRED EMBODIMENTS

FIG. 1 shows the basic construction of an optical system, according to the invention, which comprises a high-aperture objective 1 which is ale for use with an immersion liquid and, downstream of the latter on the image side, a tube lens unit 2 with an optical element 3 without refractive power. The objective itself comprises a plurality of individual lenses and/or lens groups which are assembled in partial systems T1, T2 and T3. The lens groups are constructed as cemented doublets or cemented triplets.

The tube lens unit 2 shown in FIG. 1 advantageously comprises cemented doublets 2.1 and 2.2 or a lens and an optical element 3 without refractive power which is arranged downstream on the object side of the cemented components or the lens.

The lens arrangement of a high-aperture objective 1 according to the invention shown in FIG. 2 likewise has three partial systems T1, T2 an T3. Considered from the object side, the first partial system T1 comprises a cemented doublet with lenses L0 and L1 and the individual lens L2 and the individual lens L3. Together, the individual lenses L2 and L3 have a total refractive power of 0.14 D to 0.24 D, where D is the total reactive power of the objective 1. The individual lenses L2 and L3 are made of fluor crown or $CaF_2$.

The second partial system T2 of this objective 1 comprises, in order, a cemented doublet with a maximum refractive power of 0.06 D formed of lenses L4 and L5 and a cemented triplet with a total refractive power of 0.12 D to 0.20 D comprising lenses L6, L7 and L8. The negative lens L4 of the cemented doublet is made of a short flint glass, and the positive lens L5 of this cemented component is made of fluor crown glass or $CaF_2$.

The third partial system T3 of this objective 1 comprises two menisci which are formed as cemented doublets and comprise lenses L9 to L12. The first meniscus considered from the object side conforms to the relationship $0.0045 < -D*D_k < 0.0059$, and the following second meniscus has essentially no refractive power, where $D_k$ is the refractive power of the first meniscus.

The optical data of an objective constructed according to FIG. 1 are shown in the following table:

TABLE 1

| Surface | Radius r | Thickness d | Refractive index $n_e$ | Abbe Number $v_e$ |
|---|---|---|---|---|
| 0 | | | oil immersion | |
| 1 | infinite | 0.57 | 1.489 | 70.2 |
| 2 | −0.668 | 3.4 | 1.820 | 46.4 |
| 3 | −3.400 | 0.25 | | |
| 4 | −12.771 | 2.95 | 1.530 | 76.6 |
| 5 | −6.541 | 0.10 | | |
| 6 | −180.409 | 3.10 | 1.530 | 76.6 |
| 7 | −12.958 | 0.10 | | |
| 8 | 29.639 | 1.20 | 1.616 | 44.3 |
| 9 | 13.335 | 6.20 | 1.440 | 94.6 |
| 10 | −17.529 | 5.17 | | |
| 11 | 42.475 | 2.90 | 1.440 | 94.6 |
| 12 | −17.402 | 1.20 | 1.641 | 42.2 |
| 13 | 9.858 | 4.70 | 1.440 | 94.4 |

TABLE 1-continued

Figure 4:
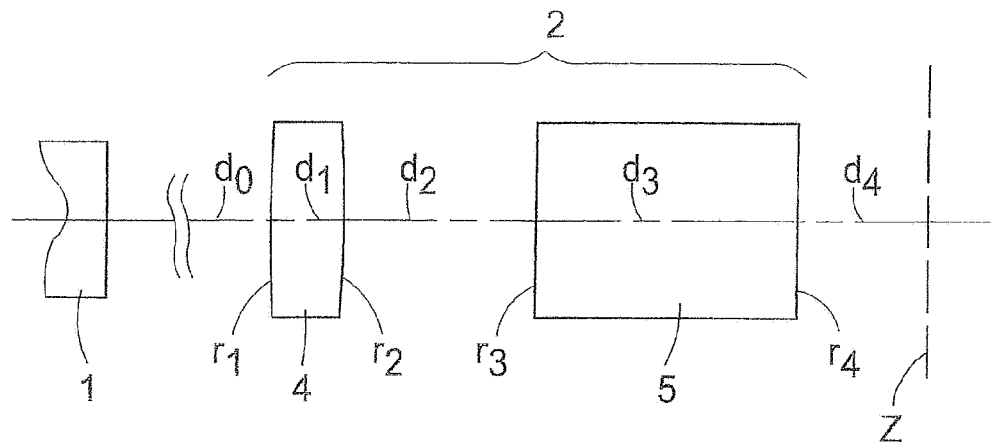
FIG. 4 shows the lens arrangement of a tube lens unit.

| Surface | Radius r | Thickness d | Refractive index $n_e$ | Abbe Number $v_e$ |
|---|---|---|---|---|
| 14 | −19.248 | 0.10 | | |
| 15 | 7.606 | 4.80 | 1.498 | 81.0 |
| 16 | −84.745 | 1.15 | 1.616 | 44.3 |
| 17 | 5.465 | 4.99 | | |
| 18 | −12.230 | 1.38 | 1.561 | 53.8 |
| 19 | 7.829 | 3.52 | 1.602 | 37.8 |
| 20 | −17.529 | | | | magnification: 40x
numerical aperture: 1.3
coverslip thickness: 0.17 mm
working distance: 0.259 mm FIG. 4 shows a corresponding tube lens unit 2 which is arranged downstream of the objective 1 on the image side. It comprises a lens 4 with positive refractive power, which is arranged in the microscope beam path at a distance of 126.5 mm from the objective 1, and an optical element 5 which has zero refractive power and is arranged at a distance $d_0$ of 60.0 mm from lens 4. The data of this tube lens unit 2 are shown in Table 2.

TABLE 2

Tube lens unit data

| Surface | Radius r | Thickness d | Refractive index $n_e$ | Abbe Number $v_e$ |
|---|---|---|---|---|
| 0 | | 126.5 | | |
| 1 | 189.417 | 10.9 | 1.582 | 53.6 |
| 2 | −189.417 | 60 | | |
| 3 | infinity | 80 | 1.519 | 64.0 |
| 4 | infinity | 48.2 | | |
| 5 | intermediate image plane | | | |

The lens arrangement shown in FIG. 3 for another high-aperture objective 1 according to the invention likewise-comprises the three partial systems T1, T2 and T3. Considered from the object side, the first partial system T1 comprises a first cemented doublet which has lenses L1 and L2 and which has the shape of a meniscus which is concave toward the object, and a second individual lens L3 and third individual lens L4. The individual lenses L3 and L4 together have a total refractive power of 0.14 D to 0.24 D, where D is the total refractive power of the objective 1. The individual lenses L3 and L4 are made of fluor crown glass or $CaF_2$.

The second partial system T2 of this objective 1 according to FIG. 3 comprises, in order, a cemented triplet with a maximum refractive power of 0.06 D which is formed of lenses L5, L6 and L7 and a cemented doublet with a total refractive power of 0.12 D to 0.20 D comprising lenses L8 and L9. The cemented triplet comprises a central negative lens L6 which is enclosed by positive lenses L5 and L7. The maximum refractive power of this cemented triplet is 0.06 D. Lenses L5 and L7 are made of a short flint glass and fluor crown glass or $CaF_2$, and lens L6 is made of a short flint glass. The cemented doublet comprises a positive lens L8 of fluor crown glass or $CaF_2$ and a negative lens L9 of short flint glass.

The third partial system T3 of this objective 1 comprises a lens L10 which is formed as a meniscus and a meniscus constructed as a cemented doublet comprising lenses L11 and L12. The lens L10 conforms to the relationship $0.0045 < -D*D_k < 0.0059$, and the following meniscus has essentially no refractive power, where $D_k$ is the refractive power of lens L10 in this embodiment example.

The optical data of an objective constructed according to FIG. 3 are shown in the following table:

TABLE 3

| Surface | Radius r | Thickness d | Refractive index $n_e$ | Abbe Number $v_e$ |
|---|---|---|---|---|
| 0 | | | water immersion | |
| 1 | −9.039 | 4.80 | 1.519 | 64.0 |
| 2 | −19.248 | 4.61 | 1.597 | 35.0 |
| 3 | −9.576 | 0.40 | | |
| 4 | −101.598 | 5.00 | 1.440 | 94.6 |
| 5 | −14.227 | 0.10 | | |
| 6 | 64.011 | 5.50 | 1.440 | 94.6 |
| 7 | −21.754 | 0.50 | | |
| 8 | 58.715 | 7.00 | 1.530 | 76.6 |
| 9 | −15.181 | 1.50 | 1.641 | 42.2 |
| 10 | 14.227 | 6.80 | 1.440 | 94.6 |
| 11 | −53.084 | 0.10 | | |
| 12 | 14.539 | 7.10 | 1.440 | 94.6 |
| 13 | −68.788 | 1.77 | 1.561 | 53.8 |
| 14 | 89.771 | 0.39 | | |
| 15 | 12.320 | 9.12 | 1.758 | 52.1 |
| 16 | 4.800 | 5.45 | | |
| 17 | −6.587 | 4.51 | 1.519 | 64.0 |
| 18 | 10.441 | 11.62 | 1.530 | 76.6 |
| 19 | −12.958 | | | | magnification: 20
numerical aperture: 1.0
working distance: 2.149

Figure 5:
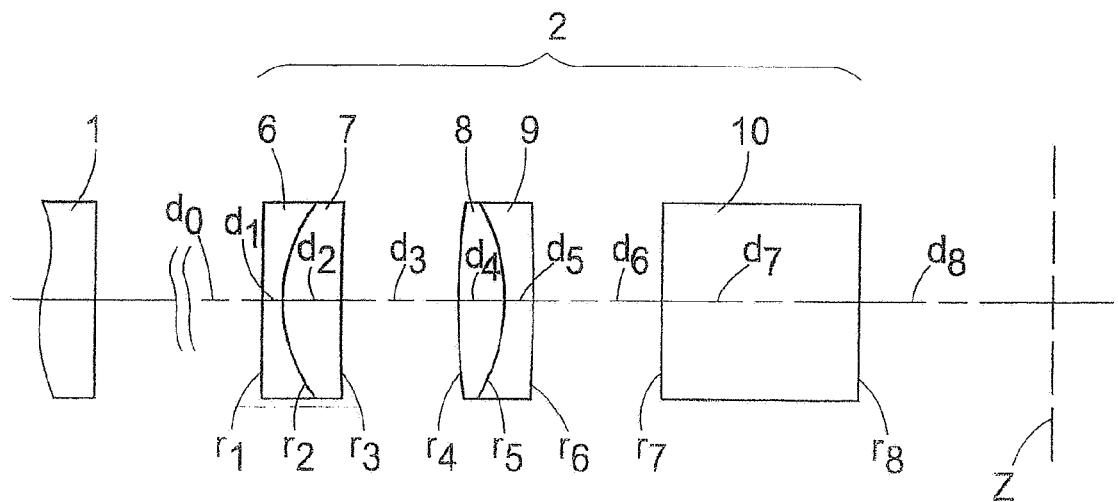
FIG. 5 shows the lens arrangement of another tube lens unit.

FIG. 5 shows a corresponding tube lens unit 2 which is arranged downstream of the objective 1 on the image side. This tube lens unit 2 comprises a cemented doublet, which is arranged in the microscope beam path at a distance from the objective 1 and which has a lens 6 with negative refractive power and a lens 7 with positive refractive power, and another cemented doublet having a lens 8 with positive refractive power and a lens 9 with negative refractive power and an optical element 10 which has zero refractive power and which is arranged at a distance $d_0$ of 126.5 mm from lens 9. The data of this tube lens unit 2 are shown in Table 4.

TABLE 4

Tube lens unit data

| Surface | Radius r | Thickness d | Refractive index $n_e$ | Abbe Number $v_e$ |
|---|---|---|---|---|
| 0 | | 132 | | |
| 1 | 233.816 | 4 | 1.723 | 29.3 |
| 2 | 28.386 | 12 | 1.716 | 53.6 |
| 3 | 209.659 | 10.69 | | |
| 4 | 131.464 | 13 | 1.624 | 36.1 |
| 5 | −27.189 | 4 | 1.623 | 60.1 |
| 6 | −328.015 | 55.18 | | |
| 7 | infinity | 80 | 1.519 | 64 |
| 8 | infinity | 48.2 | | |
| 9 | intermediate image plane | | | |

The data of another objective which is constructed according to FIG. 3 are given in the following Table 5.

TABLE 5

| Surface | Radius r | Thickness d | Refractive index $n_e$ | Abbe Number $v_e$ |
|---|---|---|---|---|
| | | | water immersion | |
| 1 | −9.039 | 5.10 | 1.519 | 64.0 |
| 2 | −18.040 | 4.25 | 1.725 | 34.5 |
| 3 | −10.441 | 0.40 | | |
| 4 | −77.181 | 5.00 | 1.440 | 94.6 |
| 5 | −13.820 | 0.10 | | |
| 6 | 66.354 | 5.50 | 1.440 | 94.6 |
| 7 | −21.442 | 0.50 | | |
| 8 | 44.990 | 7.20 | 1.530 | 76.6 |
| 9 | −15.396 | 1.50 | 1.641 | 42.2 |
| 10 | 13.724 | 6.80 | 1.440 | 94.6 |
| 11 | −81.166 | 0.10 | | |
| 12 | 14.331 | 8.00 | 1.440 | 94.6 |
| 13 | −34.724 | 1.60 | 1.561 | 53.8 |
| 14 | 381.220 | 0.30 | | |
| 15 | 11.965 | 8.24 | 1.758 | 52.1 |
| 16 | 4.800 | 5.62 | | |
| 17 | −6.587 | 4.50 | 1.519 | 64.0 |
| 18 | 10.667 | 11.67 | 1.530 | 76.6 |
| 19 | −12.958 | | | | magnification: 20
numerical aperture: 1.0
working distance: 2.15

The associated tube lens unit is shown in FIG. 5. The data of the tube lens unit correspond to the values indicated in Table 4.

The constructional data of another objective according to the invention which is not shown and which likewise comprises three partial systems are indicated in Table 6. In this case, the first partial system provided on the object side comprises a cemented doublet and two individual lenses. The second partial system which is arranged downstream on the image side comprises a cemented triplet and a cemented doublet. Downstream of the latter on the image side in the third partial system, there follows a cemented doublet and an individual lens.

TABLE 6

| Surface | Radius r | Thickness d | Refractive index $n_e$ | Abbe Number $v_e$ |
|---|---|---|---|---|
| | | | water immersion | |
| 1 | −9.039 | 1.82 | 1.610 | 56.4 |
| 2 | −24.052 | 6.69 | 1.725 | 34.5 |
| 3 | −9.307 | 0.10 | | |
| 4 | 110.5977 | 5.50 | 1.440 | |
| 5 | −18.1711 | 0.30 | | |
| 6 | 58.2937 | 5.20 | 1.440 | 94.6 |
| 7 | −22.712 | 0.50 | | |
| 8 | 51.2124 | 6.40 | 1.530 | 76.6 |
| 9 | −15.732 | 1.50 | 1.641 | 42.2 |
| 10 | 14.433 | 7.40 | 1.440 | 94.6 |
| 11 | −29.2156 | 0.10 | | |
| 12 | 12.496 | 7.49 | 1.440 | 94.6 |
| 13 | −41.2689 | 1.60 | 1.561 | 53.8 |
| 14 | 29.8533 | 0.30 | | |
| 15 | 8.059 | 4.60 | 1.758 | 52.1 |
| 16 | 4.529 | 5.71 | | |
| 17 | −5.662 | 2.62 | 1.525 | 59.2 |
| 18 | 9.173 | 11.04 | 1.530 | 76.6 |
| 19 | −11.6472 | | | | magnification: 20x
numerical aperture: 1.0
working distance: 2.152 mm

The constructional data of the associated tube lens unit correspond to the values indicated in Table 2.

Figure 6:
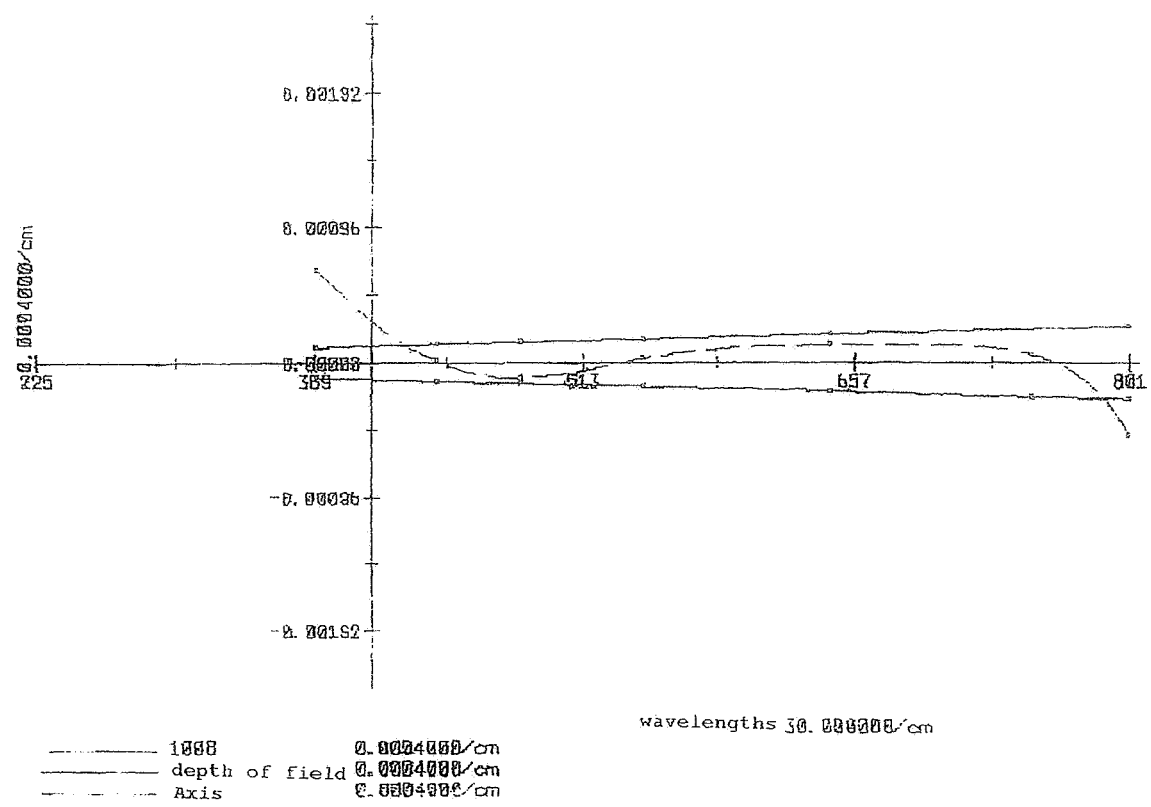
FIG. 6 schematically illustrates the chromatic correction of an objective according to the invention.

The schematic representation of the chromatic aberration in FIG. 6 shows that an objective according to the invention has very good correction in the near infrared, in this case, e.g., 800 nm.

The invention is not limited to the embodiment examples shown herein. Further developments by a person skilled in the art do not constitute a departure from the protected field.

While the foregoing description and drawings represent the present invention, it will be obvious to those skilled in the art at various changes may be made therein without departing from the true spirit and scope of the present invention.

| Reference Numbers | |
|---|---|
| 1 | objective |
| 2 | tube lens unit |
| 3 | optical element without refractive power |
| 4 | lens |
| 5 | optical element |
| 6 to 9 | lens |
| 10 | optical element |
| T1 to T3 | partial systems |
| L1 to L2 | lenses |
| $r_1$ to $r_{20}$ | radii |
| $d_1$ to $d_{19}$ | thicknesses |
| D | total refractive power of the objective |
| $D_k$ | refractive power of the first meniscus of the third partial system |

What is claimed is:

1. An optical imaging system, particularly for microscopes, comprising:

an objective and a tube lens unit;

said objective having a magnification of less than or equal to 40× and a numerical aperture of greater than or equal to 1.0 and being chromatically up to the infrared.

2. The optical imaging system according to claim 1, wherein objective is formed of partial systems comprising a plurality of lenses and/or lens groups and comprises:

a first partial system which has, in order from the object side, a first individual lens or has a first cemented doublet and a second individual lens and third individual lens, wherein the second individual lens and third individual lens have a total refractive power of 0.14 D to 024 D;

a second partial system which is formed of a cemented triplet with a maximum refractive power of 0.06 D and of a second cemented doublet with a refractive power of 0.12 D to 0.2 D; and and a third partial system which comprises a cemented doublet and an individual lens or an individual lens and a meniscus formed as a cemented component or two menisci formed as cemented components, wherein, considered from the object side, the first meniscus conforms to the relationship $0.0045 < -D*D_k < 0.0059$, and the second meniscus has essentially no refractive power, where D is the total refractive power of the objective and $D_k$ is the refractive power of the first meniscus of the third partial system.

3. The optical imaging system according to claim 2, wherein the first cemented doublet or first lens has the shape of a meniscus which is concave toward the object and has a magnification factor of 1.73 to 1.81.

4. The optical imaging system according to claim 2, wherein a lens (L1) is provided in the first partial system instead of the first cemented doublet, and the second individual lens (L2 or L3) and third individual lens (L3 or L4) are made of fluor crown glass or $CaF_2$.

5. The optical imaging system according to claim 2, wherein the cemented triplet of the second partial system comprises a central lens (L6 or L7) with negative refractive power made of short flint glass and two lenses (L5 and L7 or L6 and L8) with positive refractive power made of fluor crown glass or $CaF_2$.

6. The optical imaging system according to claim 2, where the second cemented doublet (L4 and L5 or L8 and L9) of the second partial system comprises a lens (L4 or L9) with negative refractive power made of short flint glass and a lens (L5 or L8) with positive refractive power made of fluor crown glass or $CaF_2$.

7. The optical imaging system according to claim 2, wherein the first meniscus of the third partial system is formed as a cemented component (L9 and L10) or individual lens (L10).

8. The optical imaging system according to claim 2, wherein the concave surfaces of the two menisci of the third partial system are adjacent.

9. The optical imaging system according to claim 2, wherein a tube lens unit comprising at least two optical components is arranged downstream of the objective considered from the object side.

10. The optical imaging system according to claim 9, wherein a tube lens unit comprising a lens with positive refractive power and an optical element without refractive power is arranged downstream of the objective considered from the object side.

11. The optical imaging system according to claim 9, wherein a tube lens unit comprising two cemented doublets and an optical element without refractive power is arranged downstream of the objective considered from the object side.

12. The optical imaging system according to claim 9, wherein the optical element of the tube lens unit without refractive power is made of BK7 or another suitable optical glass.

13. A microscope comprising an optical imaging system according to claim 1.

* * * * *